United States Patent [19]

Hall

[11] 4,336,913
[45] Jun. 29, 1982

[54] COMPOUND WING AIRCRAFT

[76] Inventor: Eric B. Hall, 135, Spring Grove Crescent, Hounslow Middlesex TW3 4DA, England

[21] Appl. No.: 81,198

[22] Filed: Oct. 2, 1979

[51] Int. Cl.$^3$ ............................................. B64C 39/08
[52] U.S. Cl. .................................. 244/45 R; 244/13; 244/16; 244/DIG. 1; D12/319
[58] Field of Search ................. 244/16, 45 R, DIG. 1, 244/13, 87, 154; D12/71, 77, 87, 319, 331

[56] References Cited

U.S. PATENT DOCUMENTS

| | | | |
|---|---|---|---|
| 1,264,037 | 4/1918 | Emmons | 244/45 R |
| 3,883,092 | 5/1975 | Ditto | 244/154 |
| 3,942,747 | 3/1976 | Wolkovitch | 244/45 R |
| 3,995,799 | 12/1976 | Bartolini | 244/DIG. 1 |
| 4,050,654 | 9/1977 | Heckman | 244/DIG. 1 |
| 4,053,125 | 10/1977 | Ratony | 244/45 R |
| 4,090,681 | 5/1978 | Zimmer | 244/45 R |

FOREIGN PATENT DOCUMENTS

| | | | |
|---|---|---|---|
| 2617033 | 11/1977 | Fed. Rep. of Germany | 244/DIG. 1 |
| 42428 | 7/1933 | France | 244/45 R |
| 2271124 | 12/1975 | France | 244/DIG. 1 |

*Primary Examiner*—Charles E. Frankfort
*Attorney, Agent, or Firm*—Emory L. Groff, Jr.

[57] ABSTRACT

An aircraft, either rigid-wing or a collapsible hang-glider, is provided which is a bi-plane of apparent annular-wing construction in plan view, but the wing tips of an anhedral foreplane are separated from and above the wing tips of a dihedral aftplane. In a hang-glider construction the wing tips of the foreplane may be supported above the wing tips of the aftplane by struts, the trailing edges of the foreplane wing tips being supported by the struts above the leading edges of the aftplane wings. Also in the hang-glider, the geometry of the fore and aftplanes can be varied by moving their points of connection to the keel therealong.

2 Claims, 7 Drawing Figures

COMPOUND WING AIRCRAFT

The present invention relates to an improved aircraft.

In accordance with the invention there is provided an aircraft having a swept-back, anhedral foreplane and a forward swept, dihedral aftplane, the wing tips of the foreplane being above and separated from the wing tips of the aftplane.

The port and starboard wing tips of the foreplane may be connected by struts respectively to the port and starboard wing tips of the aftplane. This may be necessary or desirable when the aircraft is in the form of a collapsible hang-glider having a longitudinal keel from opposite sides of which the wings extend, a king post upstanding from and an A-frame depending from the keel.

The leading edges of the wings are preferably reinforced by members connected to the keel and to each other in such a way that the geometry of the fore and aftplanes can be simultaneously altered by varying the distance apart along the keel of the points of connection thereto of the foreplane and aftplane wing reinforcement members. In this arrangement the inboard ends of the foreplane reinforcement members may be pivotally connected to opposite sides of a first sleeve and the inboard ends of the aftplane reinforcement members may be pivotally connected to opposite sides of a second sleeve, which sleeves surround and are fixable to the keel at chosen positions along the length of the latter, the outboard end of each foreplane reinforcement member being pivotally connected to the associated aftplane wing reinforcement member at an elbow of the latter where it bends rearwardly to support the associated aftplane wing tip. Preferably the rearwardly bent portions of the aftplane wing reinforcement members extend upwardly to terminal ends at the trailing edge of the associated aftplane wing tip and a stay extends from each said terminal end to the top of the associated strut.

The centre of the foreplane trailing edge is preferably supported above the keel by a strut upstanding therefrom and the centre of the aftplane is preferably supported by an upwardly bent tail extension of the keel.

BRIEF DESCRIPTION OF DRAWINGS

Preferred embodiments of the invention will now be described with reference to the accompanying drawings, in which.

DESCRIPTION OF PREFERRED EMBODIMENTS

Figure 1:
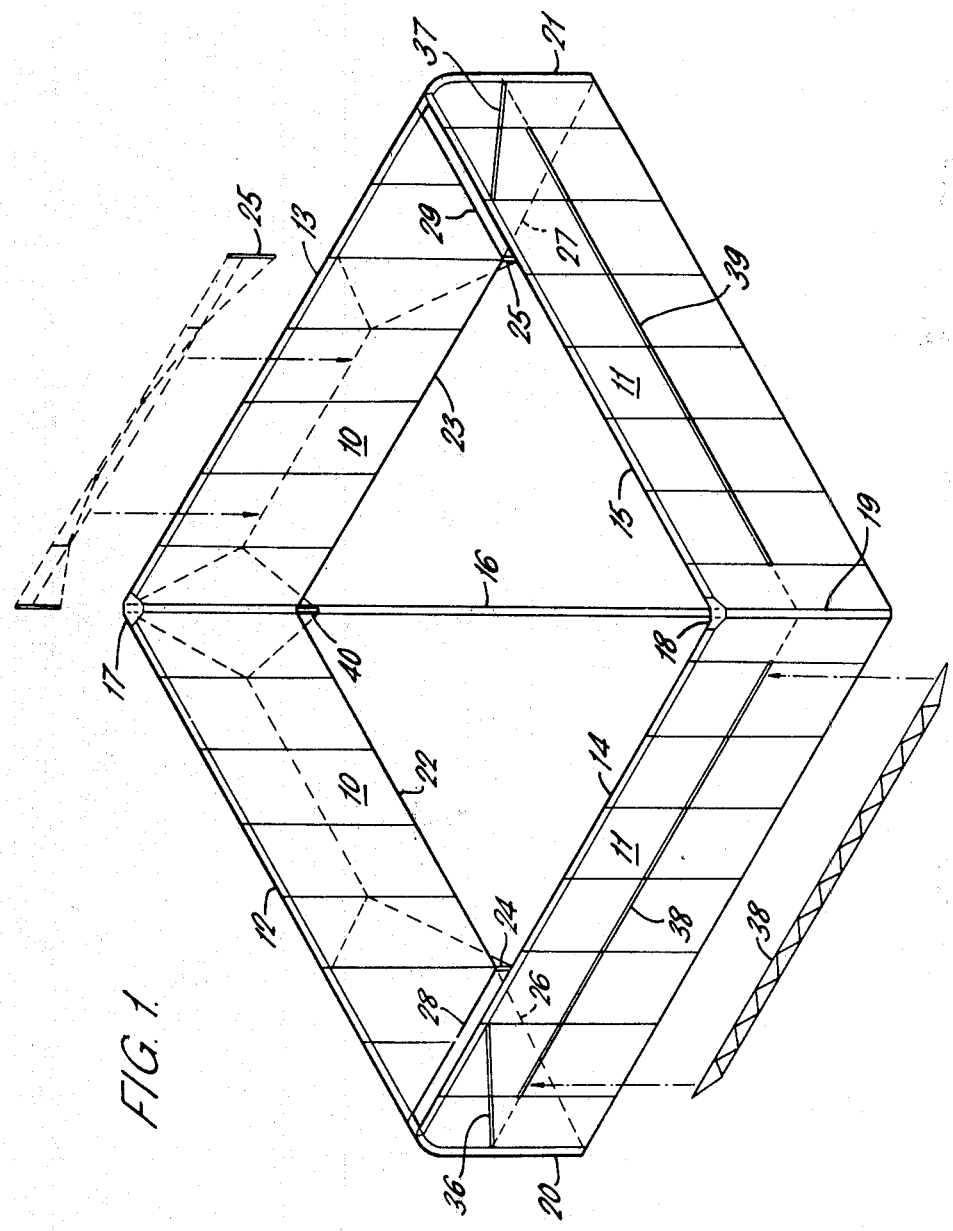
FIGS. 1-3 illustrate a hang-glider construction in accordance with the invention respectively in plan view, rear view and side elevation.
Figure 2:
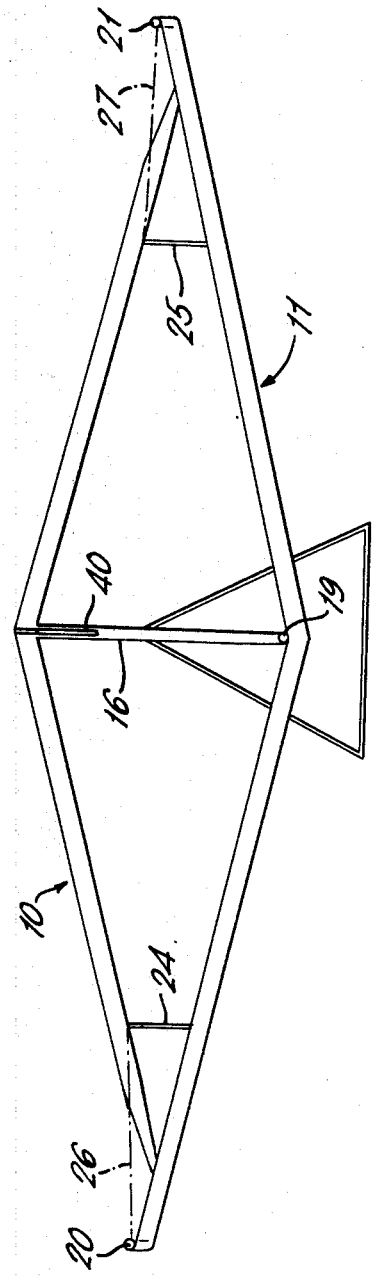
Figure 3:
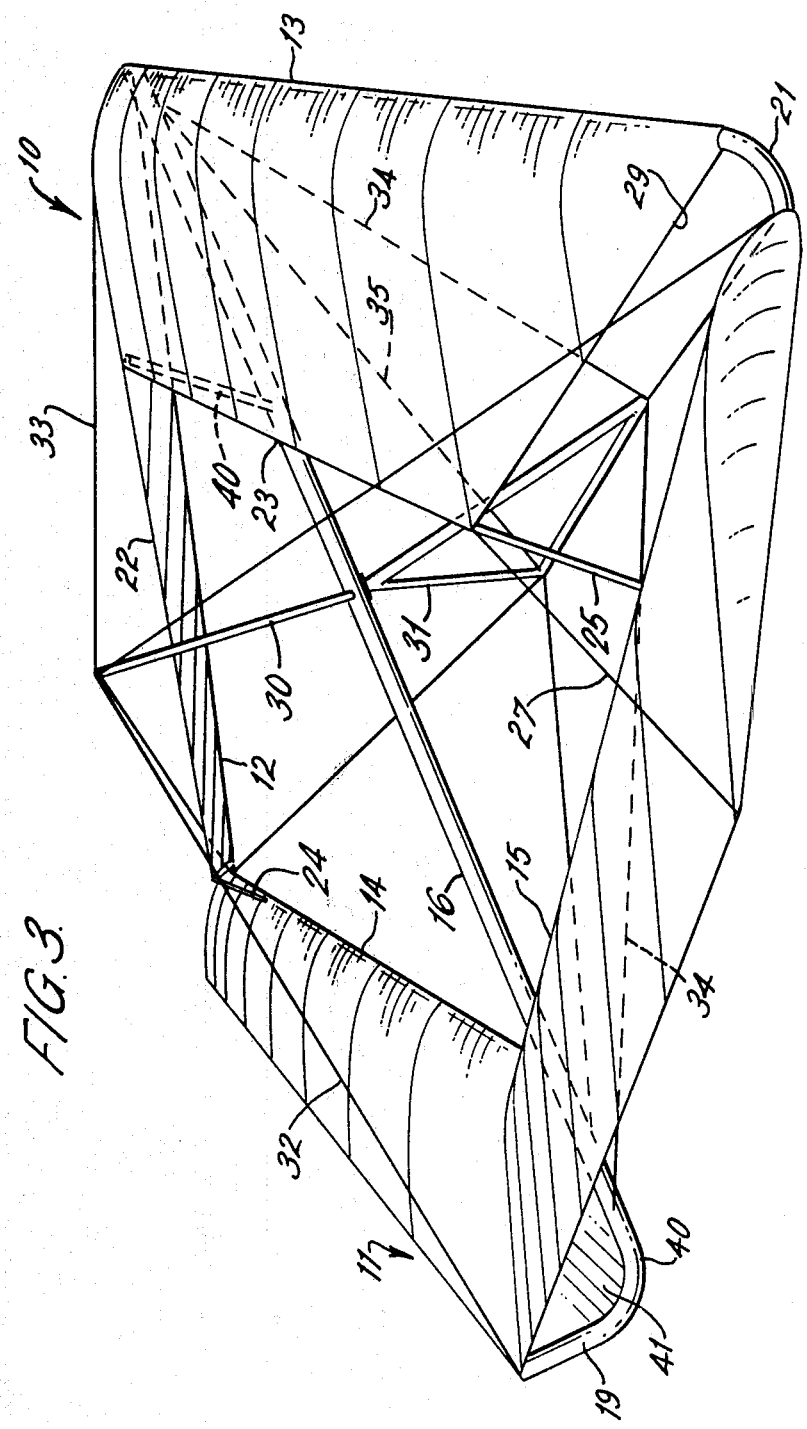
Figure 4:
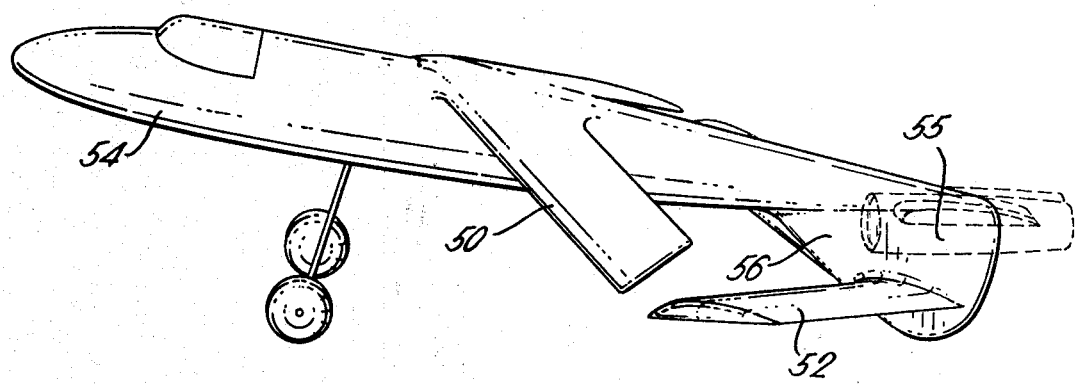
FIGS. 4-7 illustrate a rigid-wing aircraft in accordance with the invention, respectively in side elevation, rear perspective view, plan view and front elevation.
Figure 5:
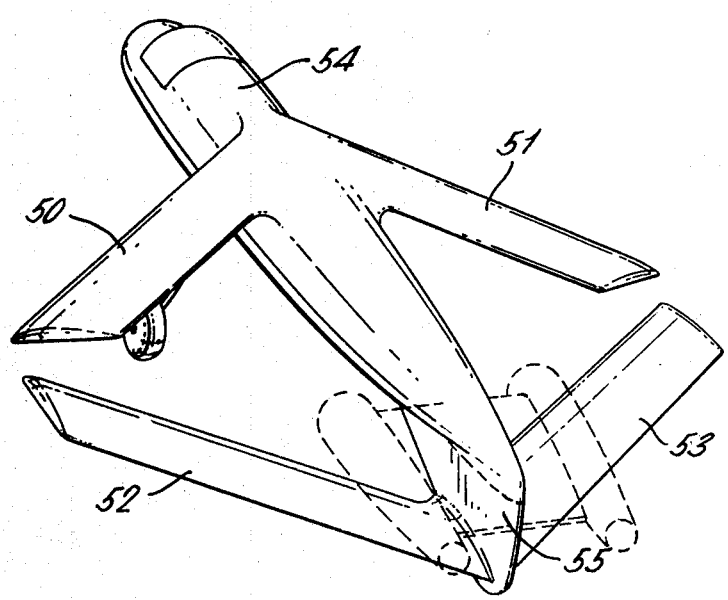
Figure 6:
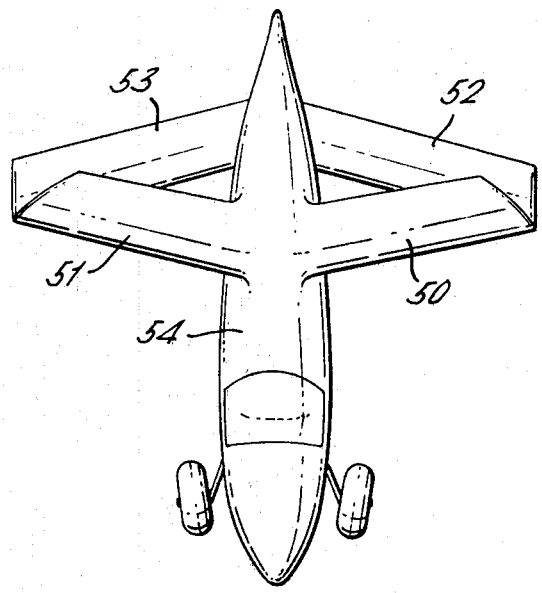
Figure 7:
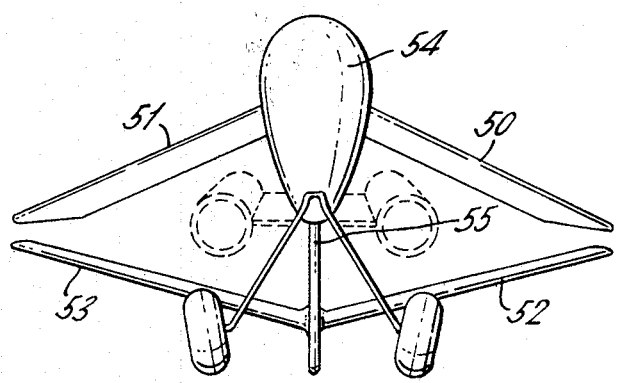

The hang-glider illustrated in FIGS. 1-3 has a swept-back foreplane 10 with a pronounced anhedral and a forward swept aftplane 11 with a pronounced dihedral. The leading edges of the four wings are reinforced by members 12, 13, 14 and 15, preferably of tubular aluminium, which extend from opposite sides of a keel member 16, preferably also of tubular aluminium, and are joined together at the wing tips so as to form congruent triangles of which the keel 16 provides the common base. As shown, the keel is surrounded and engaged by flanged sleeve connectors 17 and 18 spaced along its length to which the inboard ends of the tubes 12, 13, 14 and 15 are connected. If desired the spacing apart of the flanged connectors 17 and 18 along the keel 16 may be variable, the connections of the tubes 12, 13, 14 and 15 to the plates 17 and 18 and to each other being pivotable so that the base length and thus the apex angles of the congruent triangles can be varied to alter the flight characteristics of the aircraft. It will be apparent that such adjustment will change the anhedral or dihedral angles of the wings in direct proportion to their sweep.

The keel 16 terminates behind the connector 18 in a tail portion 19 which extends rearwardly and upwardly. The tail portion 19 supports the centre of the aftplane 11 and its elbow 40 may provide a skid. A tail plane fin 41 may extend between the upstanding part of the tail portion 19 and the part thereof continuous with the keel 16.

The outboard ends of the aftplane reinforcement members 14 and 15 are bent rearwardly and upwardly to provide aftplane wing tip reinforcements 20 and 21, which are supported by struts 36 and 37. The foreplane reinforcement members 12 and 13 are connected to the aftplane reinforcement members 14 and 15 at the elbows formed with the tip reinforcements 20 and 21. To allow variation of the geometry of the wings as previously described these connectors are preferably pivotal, and to allow collapse of the hang-glider for storage or transport they are preferably also releasable. If the optimum orientation of the members 19, 20 and 21 is predetermined the tail 19 may be integral with the keel 16 and the tip reinforcements 20 and 21 integral with the members 14 and 15, respectively. Alternatively, they may be hingedly and adjustably mounted.

The trailing edges 22 and 23 of the foreplane wings do not extend to the aftplane reinforcements 14 and 15 but are spaced therefrom by struts 24 and 25 (see FIG. 2) which upstand from the aftplane reinforcements 14 and 15 at positions spaced toward the keel 16 from the points of interconnection to the foreplane reinforcements 12 and 13. Tensioning wires or stays 26 and 27 extend from the tops of the struts 24 and 25 to the free ends of the tip reinforcements 20 and 21. In this way the wing tips 28 and 29 of the foreplane 10 are spaced vertically above the wings of the aftplane 11 and do not obstruct air flow over them (see FIG. 2). At its centre the trailing edge of the foreplane is supported by a strut 40 upstanding from the keel 16.

In the conventional way the hang-glider is provided with a king post 30 (see FIG. 3) and an A-frame 31 extending respectively above and below the keel 16 and joined to the nose and tail of the keel by stays or bracing wires 32-35. As is also conventional the wings are flexible fabric members reinforced by chordal ribs to give the required aerodynamic cross-section.

The ribs of the aftplane are supported by spars 38 and 39 within the aftplane wings, the spar 38 being shown in side elevation below FIG. 1. The ribs of the foreplane are supported by catenary linkages within the foreplane wings, one of these being shown in side elevation above FIG. 1.

It will be seen that the hang-glider has no moving control surfaces and it is intended to be guided in flight solely by weight transfer. Simple, and optionally hingeable connectors between the keel and the reinforcement members facilitate collapse or disassembly of the hang-glider for storage and transport.

FIGS. 4-7 illustrate the invention as applied to a rigid-wing aircraft, which may be a glider or a powered aircraft by incorporation of a suitable engine or engines shown in dotted lines. The four rigid wings 50,51,52 and 53 are each integral with the fuselage 54, the wing tips of the foreplane wings 50 and 51, which have a pronounced anhedral, being separated from and above the wing tips of the aftplane wings 52 and 53, which have a pronounced dihedral, so that although the aircraft looks from above (see FIG. 6) like an annular-wing aircraft it is in fact a bi-plane (see FIG. 7). The aftplane wings 52 and 53 extend from a suitably reinforced ventral tail fin 56 which also supports a rudder 55.

I claim:

1. A compound wing powered aircraft comprising a fuselage, a downwardly-directed ventral fin in the region of the rear end of the fuselage, a swept-back anhedral foreplane and a forward-swept dihedral aftplane of at least approximately equal area to the foreplane, each of said foreplane and aftplane comprising wings with leading and trailing edges and tips at their outer extremities, the foreplane wings extending from opposite sides of the fuselage, the aftplane wings extending from opposite sides of the ventral fin at a position spaced from the fuselage, the wing tips of the foreplane being above, unconnected with and separated from the wing tips of the aftplane and the wing tips of the aftplane terminating to the rear of the trailing edges of the foreplane wings.

2. A hang-glider comprising a longitudinal keel, a king post upstanding from and an A-frame depending from the keel, an upwardly bent tail extension of the keel, a swept-back, anhedral foreplane with opposite wing tips and leading and trailing edges, a strut upstanding from the keel to support the centre of the foreplane trailing edge, a forward-swept dihedral aftplane with opposite wing tips, the centre of the aftplane being supported by said tail extension, and struts connecting the port and starboard wing tips of the foreplane respectively to the port and starboard wing tips of the aftplane so that the wing tips of the foreplane are above and separated from the wing tips of the aftplane.

* * * * *